United States Patent [19]

Kobayashi et al.

[11] 4,092,402

[45] May 30, 1978

[54] METHOD FOR REMOVING SULFUR DIOXIDE FROM EXHAUST GAS

[75] Inventors: Akio Kobayashi; Kunihide Yaguchi; Masakazu Takaiwa, all of Twaki, Japan

[73] Assignee: Kureha Kagaku Kogyo Kabushiki Kaisha, Tokyo, Japan

[21] Appl. No.: 696,285

[22] Filed: Jun. 15, 1976

[30] Foreign Application Priority Data

Jun. 23, 1975 Japan .................................. 50-77224

[51] Int. Cl.$^2$ .............................................. C01B 17/00
[52] U.S. Cl. ..................................... 423/243; 423/166; 423/499
[58] Field of Search ............................... 423/242–244, 423/166, 499

[56] References Cited

U.S. PATENT DOCUMENTS

| | | | |
|---|---|---|---|
| 2,090,142 | 8/1937 | Nonhebel et al. | 423/242 |
| 2,090,143 | 8/1937 | Nonhebel et al. | 423/242 |
| 3,843,789 | 10/1974 | Specta et al. | 423/242 |
| 3,928,537 | 12/1975 | Saitoh et al. | 423/243 |

OTHER PUBLICATIONS

Industrial and Engineering Chemistry, vol. 53, No. 8, Aug. 1971, p. 620.

*Primary Examiner*—Earl C. Thomas
*Assistant Examiner*—Gregory A. Heller
*Attorney, Agent, or Firm*—Lane, Aitken, Dunner & Ziems

[57] ABSTRACT

Scale is formed in a closed system wherein an exhaust gas containing sulfur dioxide is treated with an aqueous solution containing an organic acid alkali salt to remove the sulfur dioxide in the form of gypsum from the exhaust gas. The method disclosed herein prevents formation of scale in such a closed system.

8 Claims, 3 Drawing Figures

METHOD FOR REMOVING SULFUR DIOXIDE FROM EXHAUST GAS

FIELD OF THE INVENTION

This invention relates to a method for removing sulfur dioxide from an exhaust gas. More particularly, this invention relates to a method which removes sulfur dioxide contained from the exhaust gas in the form of gypsum by treatment of the exhaust gas with an aqueous solution containing an organic acid alkali salt, which method avoids scale formation.

BACKGROUND OF THE INVENTION

A method is disclosed in U.S. Pat. No. 3,928,537 for removing sulfur dioxide in the form of gypsum from an exhaust gas, such as a combustion exhaust gas by the treatment of the exhaust gas with an aqueous solution containing an organic acid alkali salt. According to U.S. Pat. No. 3,928,537, the removal of sulfur dioxide in the form of gypsum from the exhaust gas is accomplished by bringing the exhaust gas into contact with an aqueous solution containing an organic acid alkali salt to absorb the sulfur dioxide in the form of alkali sulfite and alkali sulfate, blowing oxygen or air into the aqueous solution containing the absorbed sulfur dioxide, thereby oxidizing the alkali sulfite into the corresponding alkali sulfate, adding thereto calcium carbonate or calcium hydroxide, thereby converting the alkali sulfate into calcium sulfate (gypsum) and separating the calcium sulfate, and recirculating the solution for contact with the incoming exhaust gas. The reaction mechanism involved in this method is expressed by the following reaction formulas (1) through (4)

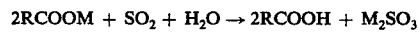
$$2RCOOM + SO_2 + H_2O \rightarrow 2RCOOH + M_2SO_3 \quad (1)$$

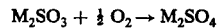
$$M_2SO_3 + \tfrac{1}{2} O_2 \rightarrow M_2SO_4 \quad (2)$$

$$2RCOOH + CaCO_3 \rightarrow (RCOO)_2Ca + CO_2 + H_2O \quad (3)$$

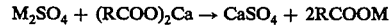
$$M_2SO_4 + (RCOO)_2Ca \rightarrow CaSO_4 + 2RCOOM \quad (4)$$

In the preceding formulas, RCOOM represents an organic acid alkali salt, RCOO an organic acid group and M an alkali metal or $NH_4$, respectively.

In the method described above, however, the solution remaining after the separation of calcium sulfate (which is an aqueous solution containing an orgaic acid alkali salt as indicated by Formula (4) given above) still has calcium sulfate dissolved therein in an amount corresponding to its solubility. When the recirculated solution still containing the dissolved calcium sulfate is returned to the absorber, the dissolved calcium sulfate crystallizes out in the form of calcium sulfite crystals or gypsum crystals and deposits within the absorption column and other process units. In the recycled solution, the alkali sulfite formed in consequence of the absorption of sulfur dioxide and the calcium sulfate dissolved in the solution react as indicated by formula (5), with the result that calcium sulfite, a compound far less soluble than calcium sulfate, is formed and crystallized.

$$CaSO_4 + M_2SO_3 \rightarrow CaSO_3 + M_2SO_4 \quad (5)$$

Further, in the cyclic use of the solution, the absorption of sulfur dioxide results in a lowered pH value and in a consequent decline of the solubility of gypsum and, at the same time, part of the alkali sulfite formed in consequence of the absorption of sulfur dioxide is oxidized by the oxygen contained in the exhaust gas and consequently converted into a corresponding alkali sulfate to increase the sulfate ion concentration in the solution, resulting in the so-called ionic product effect (common-ion effect). Thus, the crystallization of dissolved gypsum occurs in the solution. If, for example, the exhaust gas is brought into contact with an aqueous solution containing 12 percent by weight of sodium acetate, 0.3 percent by weight of acetic acid and 1 percent by weight of sodium sulfite and, as a result of continued contact, the aqueous solution comes to contain 10 percent by weight of sodium acetate and 1.8 percent by weight of acetic acid and consequently shows a lowered pH value, the solubility of gypsum in the aqueous solution declines from the original level of about 0.7 percent to about 0.3 percent. When calcium sulfite crystals or gypsum crystals are allowed to crystallize out within the reaction system in this manner, these crystals deposit on the inner wall surfaces of the process equipment causing scaling.

Moreover, in the closed system as described above wherein the exhaust gas containing sulfur dioxide is treated with an aqueous solution containing an organic acid alkali salt, the aqueous solution contains chlorine ions which are introduced with the industrial service water used to form and maintain the aqueous solution. The calcium carbonate or calcium hydroxide used for treatment also usually contains chlorides. In the case where the exhaust gas happens to be a combustion exhaust gas derived from the combustion of a fuel containing chlorides such as coal, the combustion exhaust gas carries chlorides originating in the fuel. In the circumstance, chlorine ions accumulate in the solution being circulated through the system. Usually, the combustion exhaust gas from the combustion of coal contains 30 to 150 ppm of chlorine in the form of chlorides and the industrial service water contains 20 to 50 ppm of chlorine in the form of chlorides. In addition, the industrial grade calcium carbonate contains 40 to 100 ppm of chlorine in the form of chlorides. In the treatment of 1,000,000 $Nm^3$/hour of the combustion exhaust gas from the combustion of coal containing 1000 ppm of sulfur dioxide, for example, chlorine ions accumulate at the rate of several tens of kg per hour in the solution being circulated through the system. The chlorine ions which thus accumulate in the solution are crystallize out predominantly in the form of alkali chlorides. Simultaneously with or prior to the crystallization of such alkali chlorides, other salts such as alkali sulfate and the like may crystallize. The resultant crystals also deposit as scale on the inner wall surfaces of the reaction equipment. The chlorine ions accumulated in the solution circulated in the system not merely cause the formation of scale as described above but also cause corrosion of the reaction equipment.

As the scale forms on the inner wall surfaces of the reaction equipment as described above, the interior of the absorption column experiences an increased pressure loss and the interiors of the pipes become clogged, posing various problems in the operation, maintenance and control of the reaction system. The methods for the removal of the scale thus formed in the system include a chemical treatment whereby the scale is dissolved and purged by use of chemicals and a mechanical treatment whereby the scale is scraped off and washed out with water continuously or intermittently. The former treatment has the disadvantage that the operation of the reaction system must temporarily be suspended for the system to undergo the treatment or, if the operation is not desired to be interrupted by the treatment, the reaction system must be provided with extra standby units representing a heavy expense in terms of operation or equipment. In the latter treatment, thorough removal of the scale can not satisfactorily be obtained particularly when the reaction equipment is of a large capacity.

SUMMARY OF THE INVENTION

It is, therefore, an object of the present invention to provide a method for the removal of sulfur dioxide by the so-called wet process whereby the removal of sulfur dioxide from an exhaust gas containing sulfur dioxide can be advantageously effected without the formation of scale on the inner wall surfaces of the reaction equipment.

This object and the other objects of the present invention will become apparent from the following description.

It has now been discovered that the scale derived from the calcium sulfate dissolved in the solution being circulated within the system will not form when the aqueous solution containing the organic acid alkali salt contains at least 0.3 percent by weight of gypsum crystals immediately prior to contact with the exhaust gas and the concentration of alkali sulfite in the aqueous solution decreases to no more than 2 percent by weight immadiately after the contact. It has also been discovered that in the closed system described above, the deposition of chlorides due to the accumulation of chlorine ions in the solution being circulated in the system can be prevented by concentrating a part of the solution being circulated through the system and thereby converting the chlorine ions into a salt and subsequently separating the formed salt.

According to the present invention, therefore, there is provided a method for removing sulfur dioxide from the exhaust gas in a closed system, which method includes causing the aqueous solution containing an organic acid alkali salt to contain at least 0.3 percent by weight of gypsum crystals immediately before the aqueous solution (containing dissolved gypsum) is brought into contact with the exhaust gas and causing the concentration of alkali sulfite in the aqueous solution to fall not more than 2 percent by weight in passage through the contact zone. In one embodiment of this invention, of the solution from the circulation system is concentrated to convert the chlorine ions into a salt and separating the formed salt.

BRIEF DESCRIPTION OF THE DRAWINGS:

With reference to the attached drawing.

Figure 1:
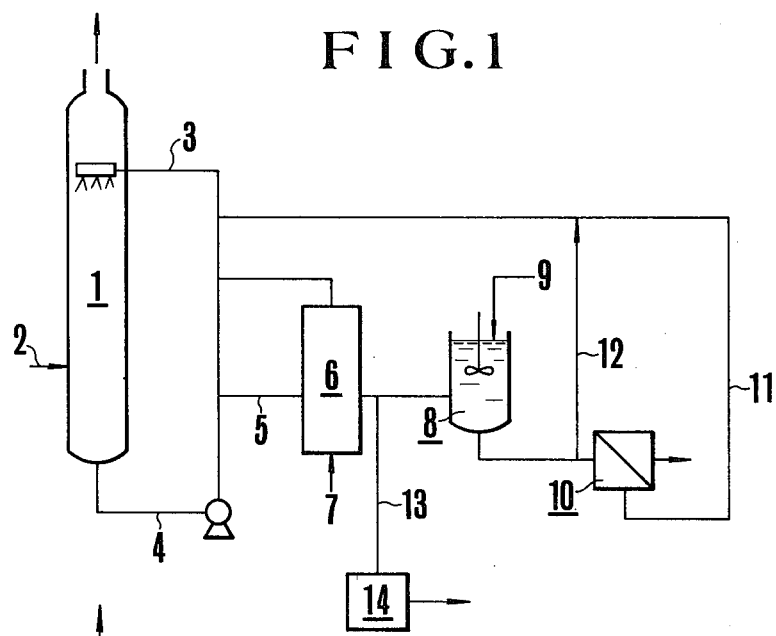
FIG. 1 is the flow diagram of a process of the present invention, which process includes subjecting a part of the effluent from the absorption column to oxidation, forming gypsum from a part of the resultant oxidized solution, separating a part of the formed gypsum and, at the same time, combining the remaining portion of the effluent from the absorption column, the remaining portion of the oxidized solution, the filtrate obtained from the separation of formed gypsum and the slurry containing the remaining part of formed gypsum (in crystalline form) and using the combined mixture as the feed liquid to the absorption column.

DETAILED DESCRIPTION OF THE INVENTION:

The organic acid alkali salts which are usable in the present invention are sodium salts, potassium salts, magnesium salts and ammonium salts of organic acids such as acetic acid, propionic acid, butyric acid and succinic acid. Examples are sodium acetate, magnesium acetate and ammonium butyrate. When the feed liquid to the absorption column contains not less than 0.3 percent by weight of gypsum crystals, the amount of gypsum crystals in the feed liquid will exceed the equivalent weight of the dissolved gypsum in an amount corresponding to its solubility. Although the amount of gypsum crystals in the feed liquid is variable with the type of the absorption column in use, the gypsum crystals may be present in such an amount as to convert the feed liquid to the form of a slurry. Where the absorption column contains perforated plates the feed liquid may contain about 25 percent by weight of gypsum crystals. From the practical point of view, the amount of gypsum crystals contained in the feed liquid to the absorption column is preferred to fall in the range of from 1 to 10 percent by weight. The feed liquid to the absorption column will contain the gypsum crystals as described above, if only a portion of the calcium sulfate formed is separated out, allowing the proper amount of the calcium sulfate to be entrained by the solution being circulated. When the feed liquid to the absorption column (the aqueous solution containing an organic acid alkali salt and additionally incorporating gypsum crystals) is brought into contact with the exhaust gas within the absorption column, if the dissolved gypsum crystallizes out it will form on the gypsum crystals already present in the liquid and will not in any substantial amount adhere to the inner wall of the absorption column. To insure that the alkali sulfite concentration in the aqueous solution is not more than 2 percent by weight immediately after the contact thereof with the exhaust gas, it suffices to control the concentration of alkali sulfite in the feed liquid to the absorption column to an amount in the range of from 0 to 1 percent by weight. Generally, the sulfur dioxide content in the exhaust gas is on the order of from 1,000 to 3,000 ppm. The amount of the aqueous solution brought into contact with 1 $Nm^3$ of the exhaust gas is from 2 to 3 liters. If the alkali sulfite concentration in the feed liquid to the absorption column is less than 1 percent by weight, then the alkali sulfite concentration in the aqueous solution containing the organic acid alkali salt immediately after the contact with the exhaust gas (the effluent from the absorption column) can be controlled at not more than 2 percent by weight. In this case, when the sulfur dioxide content in the exhaust gas is higher than on the order of from 1,000 to 3,000 ppm, the alkali sulfite concentration in the effluent from the absorption column can be controlled at not more than 2 percent by weight by increasing the amount of the aqueous solution brought into contact with the exhaust gas. Specifically, to insure that the concentration of alkali sulfite in the effluent from the absorption column is not more than 2 percent by weight, it suffices to regulate the degree of the oxidation of the alkali sulfite in the scrubbing solution or portion thereof which; is oxidized in the aforementioned closed system. The reaction between the dissolved gypsum and the alkali sulfite in the solution being circulated within the system cannot occur to any extent when the concentration of the alkali sulfite in the effluent from the absorption column is not more than 2 percent by weight.

Further, for the purpose of removing chlorine ions which accumulate in the circulating liquid during the treatment of the exhaust gas in the closed system, the present invention requires that the scrubbing solution contain not less than 0.3 percent by weight of gypsum crystals immediately prior to the contact with the exhaust gas, also requires that the concentration of alkali sulfite in the aqueous solution to be not more than 2 percent by weight immediately after contact and, at the same time, concentrates a part of the solution being circulated within the system so as to convert the chlorine ions contained therein into a salt and separates the formed salt. This concentration is accomplished by withdrawing a part of the circulating solution and concen it by a conventional method such as, for example, heating. By this treatment, the chlorine ions in the solution are educed in the form of an alkali chloride. The concentration may be continued until the volume of the withdrawn solution decreases to $\frac{1}{2}$ to $\frac{1}{3}$. The educt which results from this concentration is separated (alkali chloride alone or occasionally in conjunction with other salts such as alkali sulfate and the like) from the solution and the filtrate resulting from the separation is mixed with the circulating solution for further service. Alternatively, the withdrawn solution is evaporated to dryness. By thus removing the chlorine ions which accumulate within the circulating solution, the formation of scale due to adhesion of salts to the inner wall surfaces of the reaction equipment can be effectively prevented. In this case, the concentration of chlorine ions in the circulating solution is lowered below the tolerable concentration. The tolerable concentration of chlorine ions is governed, as a matter of course, by the composition of the circulating solution. When an aqueous solution containing sodium salt of an organic acid is used as the solution for contact with the exhaust gas, for example, the chlorine ions in the circulating solution will be converted into sodium chloride and dissolved in that form in the circulation solution. In plain water, sodium chloride dissolves to about 26 percent by weight. In an aqueous solution containing 15 percent by weight of sodium acetate and 3 percent by weight of sodium sulfate, saturation is reached after sodium chloride has dissolved to about 5.6 percent by weight. And in an aqueous solution containing 2 percent by weight of sodium acetate, 1.6 percent by weight of sodium sulfate and 5 percent by weight of magnesium sulfate, saturation is reached after sodium chloride has dissolved to about 10 percent by weight. Theoretically, it is sufficient to control the concentration of chlorine ions in the circulating solution below 5 percent by weight as sodium chloride (below 3 percent by weight as chlorine ions). In consideration of the possible variation in the composition of circulating solution and the concentration of the solution in the course of absorption, however, it is safe to control the concentration of chlorine ions below 2 percent by weight as chlorine ions. The presence of chlorine ions in the circulating solution often causes corrosion of the equipment. Possibility of the corrosion by chlorine ions is remote if as the concentration of chlorine ions is controlled below these limits.

Now, the present invention will be described more specifically with reference to the accompanying drawing.

Figure 2:
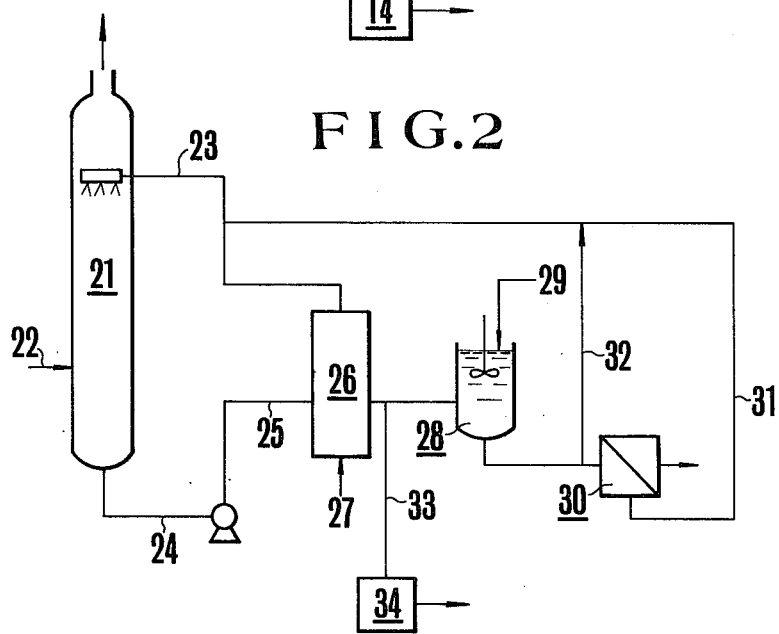
FIG. 2 is the flow diagram of a process of the present invention, which process includes subjecting the whole effluent from the absorption column to oxidation, forming gypsum from a part of the resultant oxidized solution, separating a part of the formed gypsum and, at the same time, combining the remaining part of the oxidized solution, the filtrate obtained the separation of formed gypsum and the slurry containing the remaining part of formed gypsum (in crystalline form) and using the combined mixture as the feed liquid to the absorption column.
Figure 3:
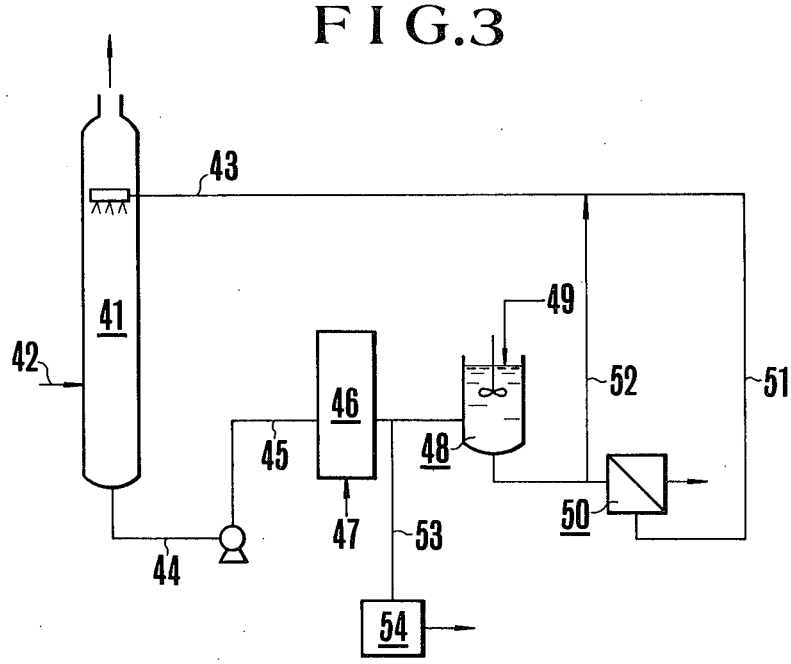
FIG. 3 is the flow diagram of a process of this invention, which includes subjecting the whole effluent from the absorption column to oxidation, forming gypsum from the whole oxidized solution, separating a part of the formed gypsum and, at the same time, combining the filtrate obtained from the separation of formed gypsum and the slurry containing the remaining portion of formed gypsum (in crystalline form) and using the combined mixture as the feed liquid to the absorption column.

In FIG. 1, the exhaust gas 2 containing sulfur dioxide and hydrogen chloride is introduced into an absorption column 1, in which it is contacted with an aqueous solution containing the organic acid alkali salt and gypsum crystals so that the sulfur dioxide is absorbed and fixed in the form of alkali sulfite. A part of the effluent 4 from the absorption column 1, which contains the formed alkali sulfite, is withdrawn via a pipe 5 into an oxidizing column 6, wherein it is oxidized with air or oxygen 7 to convert the alkali sulfite into the corresponding alkali sulfate. A part of the oxidized solution is forwarded to a gypsum producing tank 8, wherein it is combined with calcium carbonate or calcium hydroxide 9 to form gypsum. A part of the slurry containing the formed gypsum is separated in a filtration tank 10. The filtrate 11 is combined with slurry 12 containing the remaining part of gypsum, the remaining part of the effluent 4 from the absorption column 1 and the remaining part of the oxidized solution. The combined mixture is then used as the feed liquid 3 to the absorption column 1. By increasing the proportion of the solution through the oxidizing column 6 in the feed liquid 3 to the absorption column 1, the concentration of alkali sulfite in the effluent 4 from the absorption column 1 can be controlled at not more than 2 percent by weight and the dissolved gypsum can be prevented from being crystallized out in the form of calcium sulfite. FIG. 2 and FIG. 3 represent processes in which the whole effluent from the absorption column is sent through the oxidizing column and then recirculated as the feed liquid to the presence absorption column. Thus, the of alkali sulfate in the feed liquid to the absorption column is prevented.

In FIG. 2, 21 denotes an absorption column, 22 an exhaust gas, 23 a feed liquid to the absorption column 21, 24 an effluent from the absorption column 21, 25 a pipe, 26 an oxidizing column, 27 air or oxygen, 28 a gypsum producing tank, 29 calcium carbonate or calcium hydroxide, 30 a filtration tank, 31 a filtrate and 32 a slurry containing the remaining part of gypsum, respectively.

In FIG. 3, 41 denotes an absorption column, 42 an exhaust gas, 43 a feed liquid to the absorption column 41, 44 an effluent from the absorption column 41, 45 a pipe, 46 an oxidizing column, 47 air or oxygen, 48 a gypsum producing tank, 49 calcium carbonate or calcium hydroxide, 50 a filtration tank, 51 a filtrate and 52 a slurry containing the remaining part of gypsum, respectively.

In the processes illustrated in FIG. 1 through FIG. 3, the present invention removes chlorine ions which accumulate within the circulating solution by withdrawing through a branching pipe a part of the solution being circulated within the system, preferably a part of the effluent from the oxidizing column of gypsum, and concentrating the withdrawn solution. This is accomplished, in the case of a process of FIG. 1, by withdrawing a part of the circulating solution via the pipe 13 and delivering the withdrawn solution the concentration device 14. In FIG. 2, 33 denotes a pipe and 34 a concentration device. In FIG. 3, 53 denotes a pipe and 54 a concentration device, respectively. The amount of the solution withdrawn via the branching pipe naturally varies with the amount of chlorine ions which accumulate in the circulating solution and additionally with the pre-set highest concentration of chlorine ions in the solution. When an exhaust gas containing 50 ppm of hydrochloric acid gas in addition to $SO_2$ is treated at a flow rate of 1,000,000 $Nm^3$/hour, for example, chlorine ions contained in the exhaust gas are dissolved in the circulating solution at a rate of about 80 kg/hour. In this case, for the purpose of controlling the chlorine ions concentration in the circulating solution below 2 percent by weight, a part of the circulating solution must be withdrawn at a flow rate of 4 tons/hour via the pipe 13, introduced into the concentration device 14 and freed from solids containing alkali chloride such as by evaporation to dryness as illustrated in FIG. 1, for example.

With reference to the process illustrated in FIG. 1 through FIG. 3, when a part of the slurry containing the formed gypsum is used in its unaltered form as a part of the feed liquid to the absorption column, the gypsum which forms in the circulating solution owing to the lowered pH value and the increased alkali sulfate content resulting from the absorption of $SO_2$ within the absorption column deposits on the crystalline gypsum and, therefore, is prevented from adhering to the inner wall surfaces of the equipment. In this case, the amount of the slurry containing gypsum which constitutes a part of the feed liquid to the absorption column varies with the concentration of gypsum in the slurry. It is, of course, permissible to separate the formed gypsum crystals in entirely and add a part of the separated gypsum crystals to the feed liquid to the absorption column. This technique is not preferred, because of its complexity.

Now, the present invention will be described more specifically with reference to preferred embodiments which are not intended to be limiting of the invention in any way.

EXAMPLE 1

An absorption column was formed by stuffing a glass cylinder 15 cm in diameter and 150 cm in length with Raschig rings. By the procedure shown in FIG. 2, an exhaust gas resulting from the combustion of coal and containing 2,000 ppm of $SO_2$ and 50 ppm of hydrogen chloride was treated at a flow rate of 70 $Nm^3$/hour. In the first stage of this treatment, an aqueous solution containing 15 percent by weight of sodium acetate, 3 percent by weight of sodium sulfate, 0.7 percent by weight and dissolved gypsum and 5 percent by weight of crystalline gypsum was fed at a rate of 330 liters/hour into the absorption column for absorption of $SO_2$. The treatment for removal of chlorine ions was not started until the concentration of chlorine ions increased to 1.5 percent by weight.

After the solution emanating from the absorption column via its bottom portion had reached the point of containing 14.7 percent by weight of sodium acetate, 0.2 percent by weight of sodium sulfite, 3.1 percent of sodium sulfate, 0.5 percent by weight of acetic acid, 1.5 percent by weight of chlorine ions, 0.3 percent by weight of dissolved gypsum and 5.5 percent by weight of crystalline gypsum, a part of the effluent from the oxidizing column was withdrawn at a rate of 0.37 liter/hour, adjusted to pH 3 and evaporated to dryness to afford 90.3 g/hour of solids containing about 10 percent by weight of NaCl. Another part of the effluent from the oxidizing column was forwarded at a rate of 30 liters/hour to the gypsum producing tank and the remaining part was returned to the absorption column. In the gypsum producing tank, 592 g/hour of calcium carbonate was added to produce gypsum, which was separated by filtration and dried to afford 2780 g/hour of dry gypsum. A part of this gypsum was returned to the absorption column at a rate of 1725 g/hour in conjunction with a filtrate containing 15 percent by weight of sodium acetate and 0.7 percent by weight of dissolved gypsum.

The mixture of this filtrate with crystalline gypsum and the effluent from the oxidizing column plus 33g/hour of sodium hydroxide and 3.5g/hour of water was used as the feed liquid to the absorption column. This liquid was analyzed to contain approximately 14.9 percent by weight of sodium acetate, 0.3 percent by weight of acetic acid, 0.6 percent by weight of dissolved gypsum, 1.5 percent by weight of chlorine ions and 5.2 percent by weight of crystalline gypsum.

After the operation described above was continued for 300 hours, the inner wall surface of the absorption column and the surfaces of the Raschig rings were not observed to have any adhering deposits.

During operation, the ratio of sulfur dioxide absorption could be maintained over 99 percent.

EXAMPLE 2

In a manner similar to Example 1, a glass cylinder 15 cm in diameter and 150 cm in length was stuffed with Raschig rings and used an an absorption column. By the procedure shown in FIG. 3, an exhaust gas resulting from the combustion of coal and containing 2,000 ppm of $SO_2$ and 50 ppm of HCl was treated at a flow rate of 70 $Nm^3$/hour. In the first stage of this treatment, an aqueous solution containing 2.4 percent by weight of sodium acetate was fed at a flow rate of 330 liters/hour to the absorption column. The treatment for removal of chlorine ions was not started until the concentration of chlorine ions increased 2 percent by weight.

After the solution recycled the absorption column had reached the point of containing 2.4 percent by weight of sodium acetate, 6.7 percent by weight of sodium sulfate, 0.1 percent by weight of sodium sulfite, 0.2 percent by weight of dissolved gypsum, 5 percent by weight of crystalline gypsum and 2 percent by weight of chlorine ions, a part, 0.3 liter hour of the effluent from the column totaling, 330 liter/hour was withdrawn, adjusted to pH 3 and thereafter evaporated to dryness to afford 56 g/hour of solids containing 20 percent by weight of NaCl. The acetic acid which was vaporized at this time was recovered and returned to the circulating solution. The remaining part of the effluent from the oxidizing column was forwarded to the gypsum producing column, in which it was mixed with 477 g/hour of slaked lime to produce gypsum. A part of the slurry containing the formed gypsum was filtered to produce 1097 g/hour of gypsum. This filtrate and the remaining slurry containing the gypsum were mixed. The mixture was further supplement by 21.3g/hour of sodium hydroxide and 3.5kg/hour of water and fed to the absorption column.

When the operation was continued for 1000 hours as described above, the inner wall surface of the absorption column was not observed to have any adhering deposits. The effluent from the absorption column was analyzed and found to contain 20 percent by weight of sodium acetate, 7.0 percent by weight of sodium sulfate, 0.4 percent by weight of sodium sulfite, 0.3 percent by weight of acetic acid, 0.2 percent by weight of dissolved gypsum, 5 percent by weight of crystalline gypsum and 2 percent by weight of chlorine ions. No increase of chlorine ions was observed.

When the same operation was continued without the treatment for the removal of chlorine ions, the chlorine ions concentration reached 2 percent by weight. And when the operation was further continued for about 700 hours, chlorine ions in the circulating solution reached the point of saturation. The inner wall surface of the absorption column was observed to have adhering deposits of sodium and magnesium salts.

What is claimed is:

1. In a method for removing sulfur dioxide from an exhaust gas wherein the exhaust gas is contacted with an aqueous scrubbing solution containing an organic acid alkali salt in a contact zone to absorb the sulfur dioxide in the scrubbing solution in the form of alkali sulfite and alkali sulfate, wherein at least a portion of the solution is oxidized with oxygen or air to convert the alkali sulfite into alkali sulfate and, thereafter, calcium carbonate or calcium hydroxide is added to the resultant solution to convert the alkali sulfate to calcium sulfate, and the calcium sulfate is separated from the reaction solution and the resultant filtrate, along with any non-oxidized portion of said aqueous solution, is recycled for contact with said exhaust gas, the improvement comprising
   (a) using as the aqueous scrubbing solution feed to the contact zone, a solution containing at least 0.3 percent by weight of solid crystalline gypsum;
   (b) controlling the concentration of alkali sulfite in the aqueous solution exiting the contact zone at not more than 2 percent by weight; and
   (c) concentrating a part of the effluent from the oxidizing step to convert the chlorine ions contained therein into a solid salt and separating the formed salt.

2. The method according to claim 1, wherein said exhaust gas is a combustion exhaust gas of fuel containing chlorides.

3. The method according to claim 2, wherein said fuel is coal.

4. The method of claim 1, wherein the amount of crystalline gypsum contained in the scrubbing solution fed to the contact zone is in the range of from 1 to 10 percent by weight.

5. The method according to claim 1 wherein the concentration of alkali sulfite in the aqueous solution exiting the contact zone is controlled at not more than two percent by weight of controlling the rate of flow of the scrubbing solution to the contact zone.

6. The method according to claim 1 wherein the concentration of alkali sulfite exiting the contact zone is controlled at not more than two percent by weight by adjusting the amount of the solution subjected to oxidation.

7. The method of claim 5 wherein the scrubbing solution entering the contact zone contains less than one percent by weight alkali sulfite.

8. The method of claim 6 wherein the scrubbing solution entering the contact zone contains less than one percent by weight alkali sulfite.

* * * * *

UNITED STATES PATENT AND TRADEMARK OFFICE
CERTIFICATE OF CORRECTION

PATENT NO. : 4,092,402

DATED : May 30, 1978

INVENTOR(S) : Kobayashi et al

It is certified that error appears in the above-identified patent and that said Letters Patent are hereby corrected as shown below:

Column 3, line 30, change "immadiately" to --immediately--;

line 48, after "invention," insert --a portion--.

Column 5, line 35, change "concen" to --concentrating--.

Column 6, line 48, delete "presence" before "absorption"; same line, insert --presence-- before "of"; same line, change "sulfate" to --sulfite--.

Column 7, line 1, after "column" insert --or a part of the filtrate resulting from the separation--;

line 5, after "solution" insert --to--;

line 40, delete "in entirely" and insert --in entirety--.

Column 8, line 22, "g/hour" (second occurrence) should read -- kg/hour --.

line 39, change "an" (first occurrence) to --as--;

line 55, change "liter hour" to --liter/hour--;

line 68, change "supplement" to --supplemented--.

UNITED STATES PATENT AND TRADEMARK OFFICE
CERTIFICATE OF CORRECTION

PATENT NO. : 4,092,402

DATED : May 30, 1978

INVENTOR(S) : Kobayashi et al

It is certified that error appears in the above–identified patent and that said Letters Patent are hereby corrected as shown below:

Column 10, line 25, delete "of" (first occurrence) and insert --by--.

Signed and Sealed this

Twenty-sixth Day of December 1978

[SEAL]

Attest:

RUTH C. MASON
Attesting Officer

DONALD W. BANNER
Commissioner of Patents and Trademarks